2,897,083

DRYING OF SWISS WHEY

Maurice E. Hull, La Grange, and James F. Lucasey, Sullivan, Ill., and Dale Hoback, Rochester, Ind., assignors to Armour and Company, Chicago, Ill., a corporation of Illinois No Drawing. Application January 11, 1957
Serial No. 633,541

9 Claims. (Cl. 99—57)

This invention relates to an improvement in the drying of Swiss whey, and, more particularly, to a method of drying Swiss whey on a drum dryer.

Whey is a by-product of the manufacture of cheese. In cheese manufacture, milk is curdled by suitable agents to produce curds which are the precursors of cheese. The unused portion is whey. Whey is essentially a dilute solution of lactose, proteinaceous material and ash. The total solids content of whey is usually below 6.5%.

The drying of whey is not only a desirable operational step but a necessary one. It is virtually impossible to dump whey into a sewer without polluting and contaminating streams, catch-basins or the like. Not only does pollution occur which can be detrimental to animal life but the solids present produce a disagreeable odor.

Swiss whey, in particular, is known to be extremely temperamental insofar as drying is concerned. The unpredictability of its dryability is of utmost importance since failure to dry it may well result in the complete shutdown of a Swiss cheese manufacturing plant—there being no other economical way of disposing of the whey. Contrasted to all this, the other major form of cheese, namely Cheddar, has a whey that is readily dryable. So also is skimmed milk which has a composition not significantly different from Swiss whey. The essential difference in composition between skimmed milk and Swiss whey is the presence in the former of a substantially greater proportion of proteinaceous material, about 3.3% in skimmed milk as contrasted to 1% in Swiss whey. The remaining constituents in both compositions are about 5% lactose and ½% ash.

The foregoing similarity in composition provided one method of attempting to solve the problem of drying Swiss whey. This involved fortifying Swiss whey with skimmed milk which was already known to be drum dryable. This expedient proved undesirable because it was uneconomical. The value of the skimmed milk used exceeded the value of the dried Swiss whey which was marketed for animal feed. On the other hand, if the Swiss whey could be dried without such an expensive additive, its use as an animal feed was attractive financially.

This then led to another expedient employed to drum dry Swiss whey. It involved raising the protein content to a value equivalent to that of skimmed milk, but by a low priced additive. The addition of soy flour for this purpose proved of no help in drying Swiss whey. Other fillers such as dried brewers yeast and corn starch also were not productive of a dryable Swiss whey. By a dryable Swiss whey, we refer to one in which the dried product issues from a drum dryer in an expanded particle form not unlike popcorn.

The drum drying operation involves continuously flowing a liquid Swiss whey into the trough between two heated, rotating drums. After the whey has progressed about a portion of the periphery of the drum, it contacts a doctor blade associated with the drum surface which literally "shaves" the now-dried product from the surface for further disposition, as by causing dried whey to be conveyed away to a packaging area.

In the case of drum drying Swiss whey, presumably the high lactose content (about 75% of the solids present) is responsible for its unpredictability. This high lactose content, as well as its being in an anhydrous state, has the tendency of causing the dried product to become syrupy or sticky and difficult to dry. Under this condition the desired "popcorn" type of particle is not produced but rather long, gooey fibers of whey are produced on a drum dryer which foul its operation and tend to produce a glazed surface further inhibitory of proper whey drying.

Through the use of our invention a flow of Swiss whey can be continuously dried on a drum dryer to produce a desirable dried product characterized by having an expanded, fluffy particle size along with avoiding the fouling of the drying equipment characteristic of a prior Swiss whey drying operation.

It is therefore an object of our invention to provide an improved method for drying Swiss whey. Another object of our invention is the production of Swiss whey employing a drum dryer. Yet another object of our invention is the provision of a method of drum drying Swiss whey which avoids the difficulties and problems discussed above. Still another object of our invention is to provide a method of continuously drying Swiss whey which yields expanded particles considered especially desirable as an animal feed.

In the practice of our invention we have found it important to control the solids concentration of the flow of Swiss whey adjacent the point of first contact of the flow with a rotating drum dryer. Since some evaporation of the whey liquor occurs at this point, the concentration is somewhat higher than the solids concentration of the whey as produced in the separation of curds therefrom. As pointed out before, the concentration prior to drying is about 6.5% total solids of the weight of Swiss whey. We have found that in permitting this solids concentration at the point of first contact to exceed about 20% results in the undesirable product and fouling of the drying apparatus described above.

This limitation can be appreciated from the results set forth in Table I. The data summarized in the table was derived from operating a Buffalo Foundry drum dryer which included a pair of 32" diameter drums arranged in side-by-side relation with abutting revolving faces. The cusp-shaped area between the upper portions of the drums provided an entry trough for the flow of whey. The dryers were heated by internally pressuring them with 59 p.s.i. steam and each drum was rotated at a speed of 34 r.p.m. During a nine hour period the following phenomena were observed:

TABLE I

| Time (hr.) | Total solids above rolls (percent) | Condition of dried whey |
|---|---|---|
| 0 | 10.1 | Good. |
| 1 | 12.4 | Do. |
| 2 | 14.3 | Do. |
| 3 | 15.1 | Do. |
| 4 | 19.9 | Do. |
| 5 | 16.9 | Good to Fair. |
| 6 | 21.1 | Fair. |
| 7 | 26.9 | Poor. |
| 8 | 28.5 | Do. |
| 9 | 29.0 | Very poor. |

In sharp contrast to the foregoing, a drying operation of about the same duration on similar equipment involving Cheddar whey showed no such undesirable phenomena as illustrated by the data of Table II.

TABLE II

| Time (hr.) | Total solids above rolls (percent) | Condition of dried whey |
|---|---|---|
| 0 | 14.4 | Good. |
| 7.5 | 15.0 | Do. |

We have found that the control of the solids content at the important area of first contact of a continuous flow of Swiss whey with a drum dryer can be effectuated by controlling the acidity of the whey entering the trough. This was surprising in view of the fact that acidity is relatively unimportant in the drying of Cheddar whey. We have found further that the acidity of the Swiss whey need not be controlled at any one value, but rather that it be maintained against increase. Increase in acidity of whey is probably attributable to the development of lactic acid brought about by the flora or bacteria with which the milk was seeded in order to bring about curdling.

In the drying operation tabulated in Table I, the acidity of the whey coming to the dryer increased with time as shown in Table III.

TABLE III

| Time (hr.): | Percent titratable acidity |
|---|---|
| 0 | 0.10 |
| 1 | 0.115 |
| 2 | 0.12 |
| 3 | 0.10 |
| 4 | 0.11 |
| 5 | 0.13 |
| 6 | 0.15 |
| 7 | 0.15 |
| 8 | 0.17 |
| 9 | 0.20 |

The percent titratable acidity set forth above is a standard method employed by American Official Agricultural Chemists and denotes the amount of a standardized reagent needed to neutralize the solution as indicated by phenol-phthalein, and expressed in terms of lactic acid. This standardized technique is described in "Condensed Milk and Milk Products," O. F. Hunziker (7th ed., 1949).

This increase in titratable acidity can be prevented by adding a small quantity of a bacteriostatic agent such as formaldehyde to the whey prior to drying. Another run of Swiss whey similar to that tabulated in Table I but incorporating the teachings of our invention is set forth in Example I, below:

*Example I*

On the above-described drying apparatus, approximately 28,000 lbs. of unprocessed whey (representing 7 tanks of 4,000 lbs. each) was dried. The whey had a percent total solids of about 5.5–6.07%. To the first vat was added about 6 oz. of formaldehyde. In seven and one-half hours, approximately 1,585 lbs. of dried whey came from the dryer in the desirable "popcorn" form, representing a yield of about 5.6% on the weight of the whey liquor. During the period of drying the concentrated whey above the rolls (corresponding to the data of Table I) ranged from 9.54% to about 14.4% solids.

On a similar dryer but running at slightly higher speed, we found it desirable to slightly pre-heat the whey (about 120°–140° F.) in order to more carefully regulate the build-up of solids at the area of first contact of the whey with the drum dryer. Presumably, this lowered the rate of heat transfer to the whey and thereby the drying rate of the whey.

In the foregoing example, the Swiss whey being processed was from what the cheese-makers term a "normal" vat and which has a titratable acidity of about 0.10–0.12%. In contrast to a "normal" vat where the acidity developed by the retained flora occurs at a moderate rate, there are also "wild" and "dead" vats. The employment of our invention involving a "wild" vat is set forth in Example II.

*Example II*

In a five tank run (approximately 20,000 lbs. of Swiss whey) wherein the average solids content was about 6.0%, we inoculated the first tank with about 12 oz. formaldehyde, and to the remaining tanks with about 6 oz. each of formaldehyde. A yield upwards of 5.5% dried whey was obtained, again of the same desirable character.

In the case of a "dead" vat we find it desirable to treat it also with a quantity of formaldehyde as if it were a normal vat to prevent any possibility of increase of titratable acidity between the whey separator and the dryer.

We have also found that merely maintaining the solids content of the whey at the area of first contact with the drum dryer within the indicated limit is insufficient if the concentrated whey at that area exhibits the phenomenon known as "bouncing." This is characterized by a roiling or boiling appearance wherein the whey appears to threaten to overflow the trough. We have overcome that problem as shown in Example III, below:

*Example III*

During the drying of 6 tanks of "normal" Swiss whey (approximtely 24,000 lbs.) to which had been added 6 oz. formaldehyde and which appeared to be a satisfactory run (as evidenced by the absence of any fouling of the machinery due to forming a crystalline film on the dryer or fibrous, sticky whey at the doctor blade), the concentrated whey started to "bounce." We then added about 6 oz. of acetic acid to the whey which resulted in cessation of the "bouncing."

We now find that addition of about 6 oz. acetic acid to the first tank substantially prevents the appearance of bouncing through an entire run. This addition applies whether the vat be "normal" or "wild." To control the "bouncing" in the whey coming from a "dead" vat, we add about 6 oz. acetic acid to each tank of 4,000 lbs. This substantially greater quantity of acid only results in an increase of titratable acidity of 0.01%.

Thus, we have found it desirable to maintain the titratable acidity of Swiss whey entering a drum dryer trough at about the value it had when it came from the curd-whey separator. Ordinarily this will be in the range of about 0.09% for a "dead" vat to about 0.18% for a "wild" vat. The titratable acidity can be increased slightly by the addition of an acid to prevent "bouncing."

The foregoing detailed description has been given for clearness of understanding only and no unnecessary limitations are to be inferred therefrom.

We claim:

1. In a method of preparing a drum dryable Swiss whey to form an expanded particle product, comprising incorporating in said whey prior to drying an amount of formaldehyde sufficient to prevent increase in acidity of said whey at about the value of the whey issuing from the curd-whey separator.

2. In a method of preparing a drum dryable Swiss whey to form an expanded particle product, comprising incorporating in said whey prior to drying an amount of formaldehyde sufficient to prevent increase in titratable acidity of said whey and adjusting said acidity to a value in the range 0.09–0.18%.

3. A method of preparing a drum dryable Swiss whey to form an expanded particle product when dried comprising incorporating in said whey an amount of formaldehyde sufficient to prevent retained curd producing flora from developing further acidity in said whey.

4. In the method of claim 3 the step of further incorporating in said whey an amount of acetic acid sufficient to prevent "bouncing" of said whey on a drum dryer.

5. In the drying of Swiss whey by the drum process, the step of maintaining the solids concentration of the whey at the point of first contact with the heating surface at a value sufficiently low to produce expanded particles of dried whey, the said solids concentration being less than about 20%.

6. In the drying of Swiss whey by the drum process, the step of incorporating formaldehyde into a stream of Swiss whey to regulate the acidity of the whey to a value in the range of 0.09–0.18% and to maintain the solids concentration of the whey at the point of first contact with the heating surface of the drum at a value less than about 20%.

7. The method of claim 6, in which acetic acid is added to the said Swiss whey stream.

8. In a method of preparing a drum-dried Swiss whey, the step of preventing increase of whey acidity attributable to the development of lactic acid from seed flora and regulating the whey acidity to a value in the range of 0.09–0.18%, and thereby maintaining the solids content of the whey at the point of first contact with the drum at a value sufficiently low to prevent glazing of the drum surface.

9. In the drying of Swiss whey by the drum process, the steps of heating the whey prior to drying to a temperature between 120° and 140° F. and maintaining the solids concentration of the whey at the point of first contact with the drum at a value sufficiently low to produce expanded particles of dried whey, the said solids concentration being less than about 20%.

References Cited in the file of this patent

UNITED STATES PATENTS

| | | |
|---|---|---|
| 2,173,922 | Supplee | Sept. 26, 1939 |
| 2,232,248 | Lavett | Feb. 18, 1941 |

OTHER REFERENCES

Gregory et al.: Uses and Applications of Chemicals and Related Materials, 1939, pages 289 and 292.